United States Patent [19]
Masood et al.

[11] Patent Number: 5,416,760
[45] Date of Patent: May 16, 1995

[54] RECOVERY OF DATA FROM OPTICAL DATA DISK SECTORS HAVING MISSING OR DEFECTIVE SYNCHRONIZATION INFORMATION

[75] Inventors: Shakeel Masood; George Li, both of Sunnydale, Calif.

[73] Assignee: Advanced Micro Devices, Inc., Sunnyvale, Calif.

[21] Appl. No.: 813,272

[22] Filed: Dec. 24, 1991

Related U.S. Application Data

[63] Continuation-in-part of Ser. No. 807,464, Dec. 16, 1991, abandoned.

[51] Int. Cl.⁶ ............................. G11B 7/00; G11B 5/09
[52] U.S. Cl. ................................ 369/47; 369/59; 360/40; 360/49; 360/51
[58] Field of Search ................. 369/47, 48, 54, 49, 369/59; 360/49, 51, 48, 40; 358/319, 337

[56] References Cited

U.S. PATENT DOCUMENTS

| | | | |
|---|---|---|---|
| Re. 33,665 | 8/1991 | Ogawa | 369/59 |
| 4,141,046 | 2/1979 | Brown | 360/59 |
| 4,472,795 | 9/1984 | Sugiyama | 369/47 |
| 4,641,326 | 2/1987 | Tomisawa | 325/108 |
| 4,663,752 | 5/1987 | Kakuse et al. | 369/48 |
| 4,791,622 | 12/1988 | Clay et al. | 369/59 |
| 4,805,046 | 2/1989 | Kuroki et al. | 360/49 |
| 4,879,731 | 11/1989 | Brush | 375/116 |
| 4,908,812 | 3/1990 | Aoshima et al. | 369/59 |
| 5,047,877 | 9/1991 | Herting | 369/49 X |
| 5,138,599 | 8/1992 | Fukushima et al. | 369/32 |
| 5,218,590 | 6/1993 | Miyasaka | 369/54 |
| 5,229,986 | 7/1993 | Mizokami et al. | 369/59 |

FOREIGN PATENT DOCUMENTS

| | | |
|---|---|---|
| 0236017 | 9/1987 | European Pat. Off. |
| 0341852 | 11/1989 | European Pat. Off. |
| 0438355 | 7/1991 | European Pat. Off. |

OTHER PUBLICATIONS

JP61026975 Patent Abstract of Japan, publication date Feb. 6, 1986.
JP2113469 Patent Abstract of Japan, publication date Apr. 25, 1990.
JP1307062 Patent Abstract of Japan, publication date Dec. 12, 1989.
JP185260 Patent Abstract of Japan, publication date Feb. 14, 1986.
JP145566 Patent Abstract of Japan, publication date Dec. 14, 1985.

*Primary Examiner*—Aristotelis Psitos
*Assistant Examiner*—Thang V. Tran
*Attorney, Agent, or Firm*—Lowe, Price, LeBlanc & Becker

[57] ABSTRACT

A recovery routine enables data to be read from a sector of an optical data disk in the presence of damaged or missing syncs. If a sync is found, a "sync found" signal is generated to designate a normal read operation, and blocks of data read from the sector are aligned to resyncs distributed in the data stream. If a sync is not found, a pseudo sync is generated to designate a data recovery operation, and blocks of data are aligned to resyncs found in the data stream during a single pass or during separate passes through the sector at the user's option. The syncs and resyncs are searched using windows of programmably variable size for the read and recovery operations.

20 Claims, 8 Drawing Sheets

(BACKGROUND)

(BACKGROUND)

(BACKGROUND)

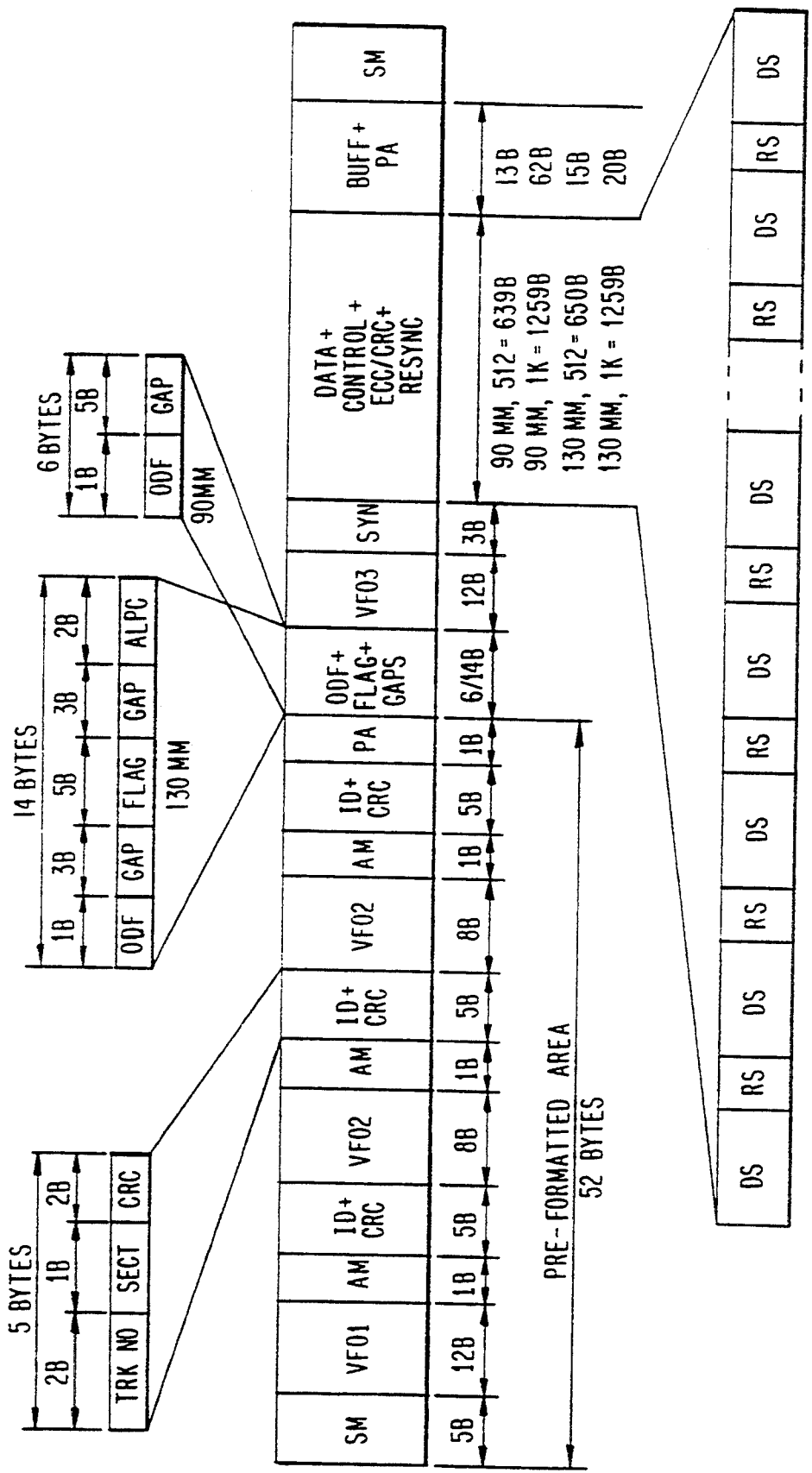
Fig. 4 (BACKGROUND)

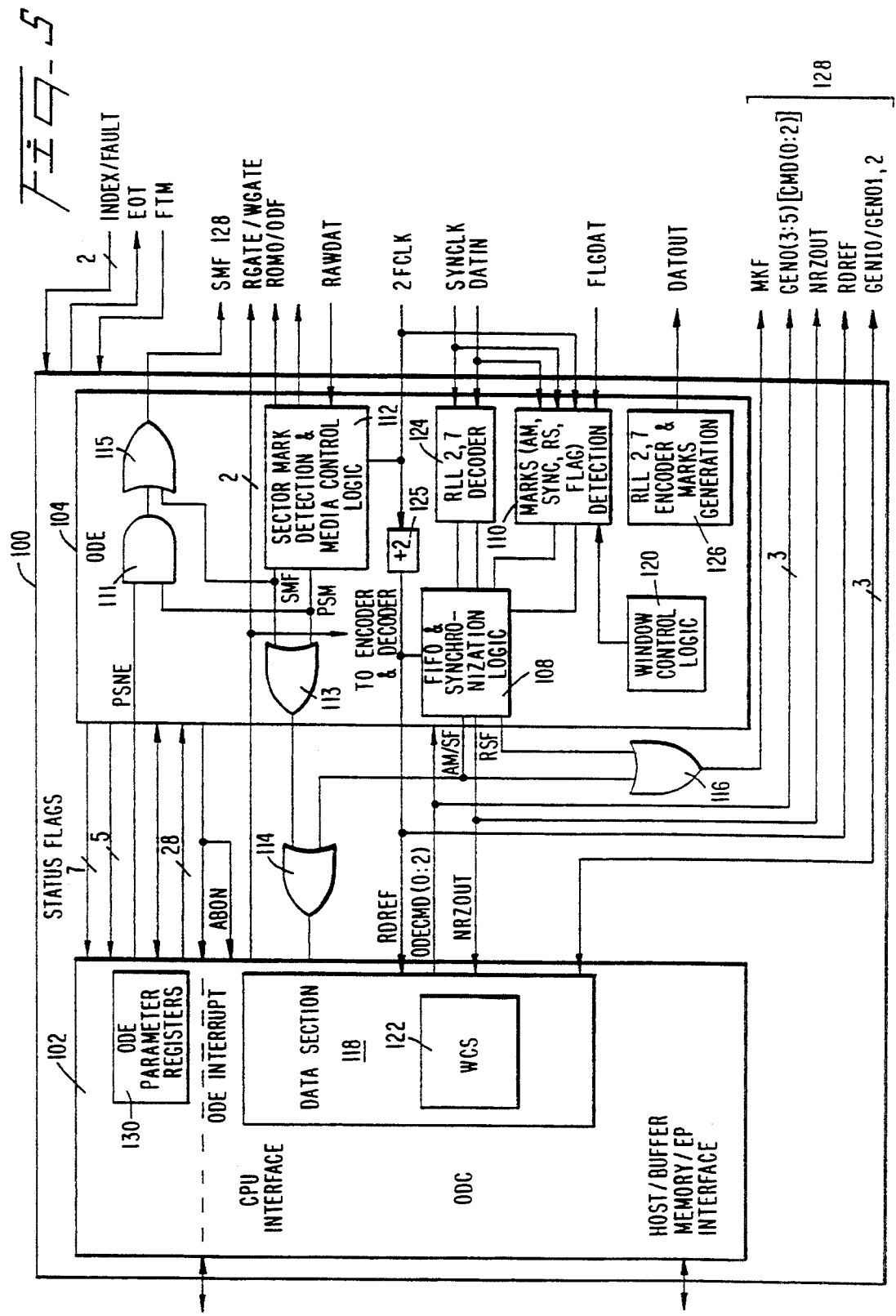

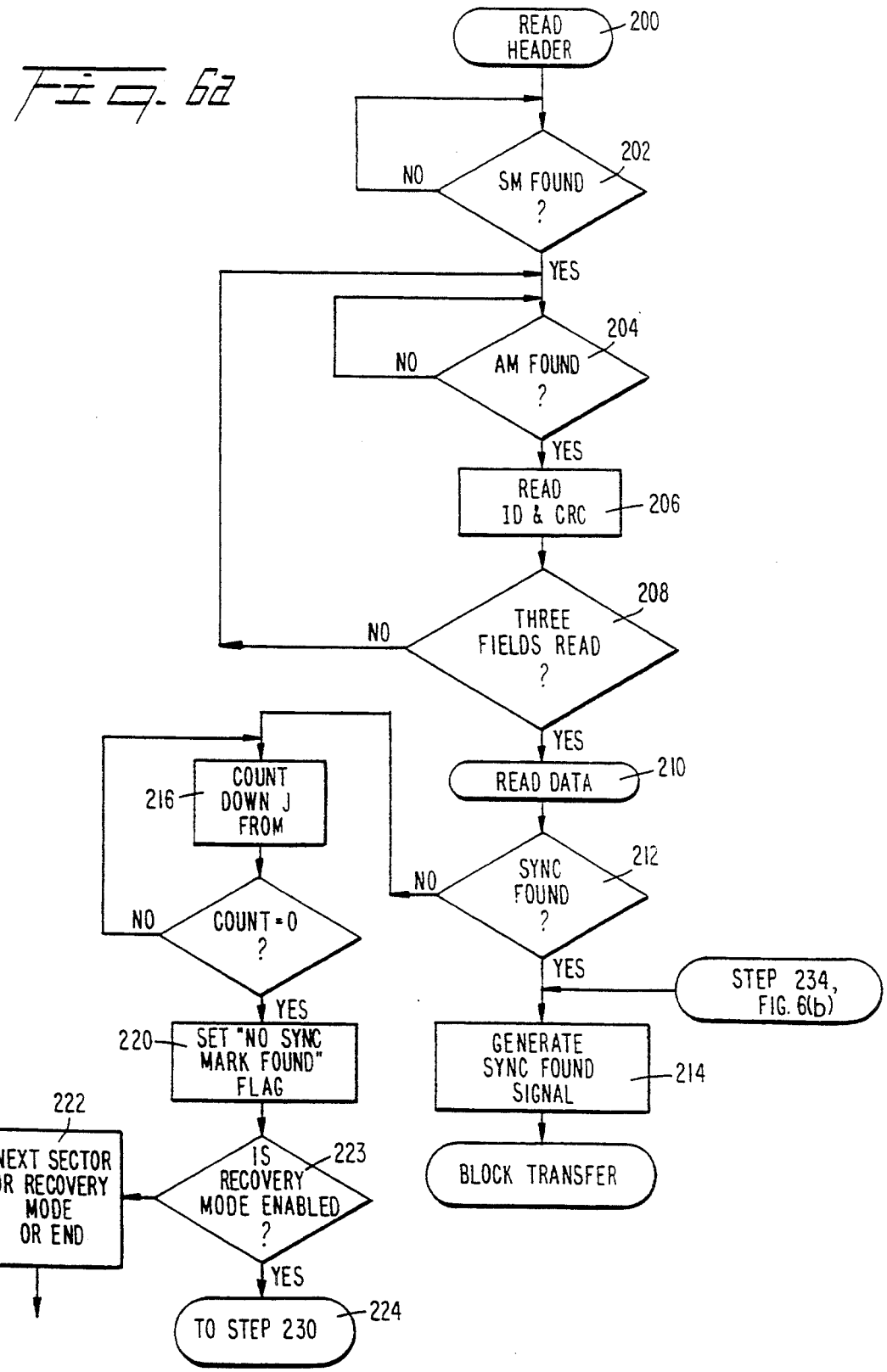

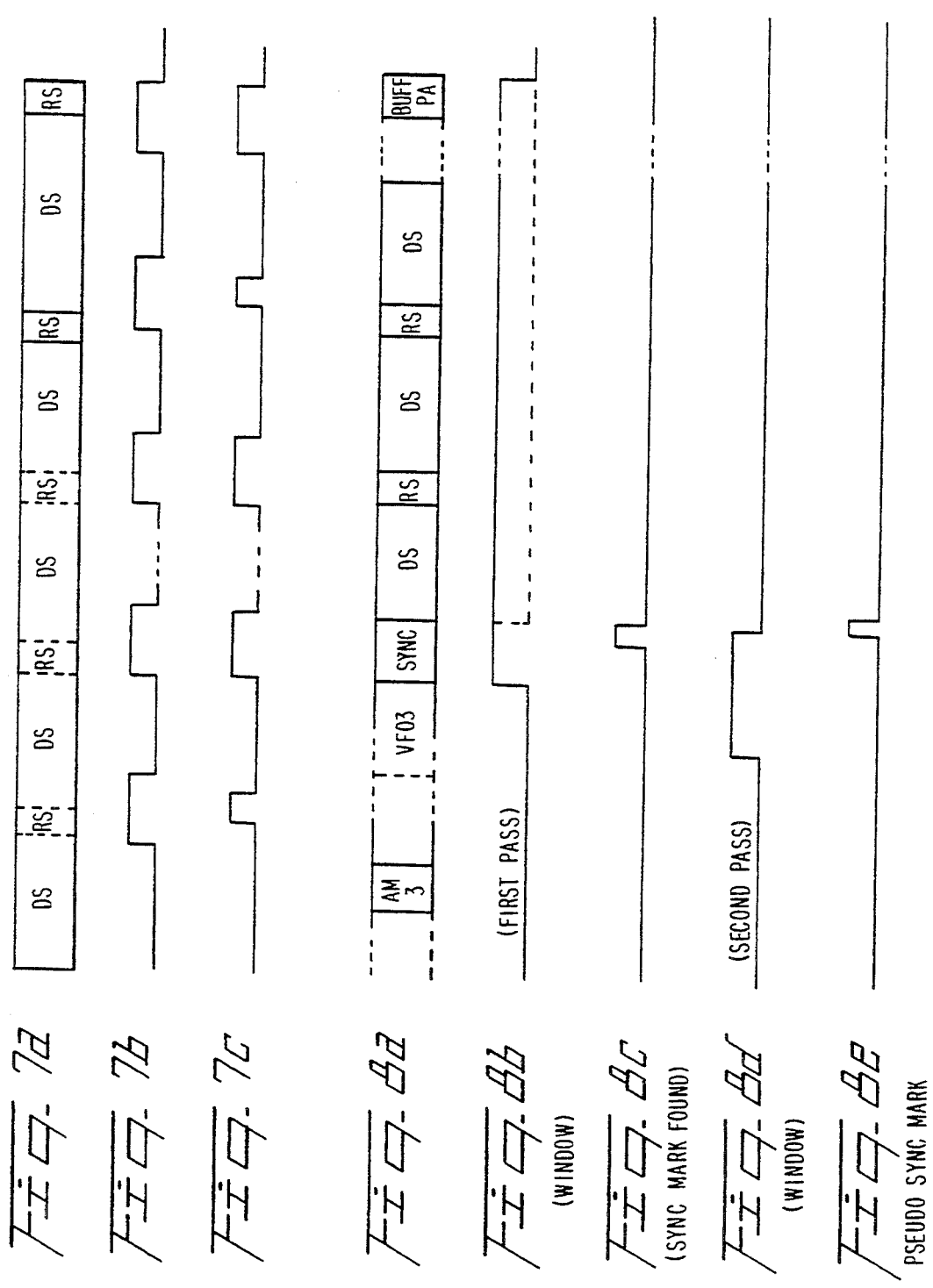

RECOVERY OF DATA FROM OPTICAL DATA DISK SECTORS HAVING MISSING OR DEFECTIVE SYNCHRONIZATION INFORMATION

This application is a continuation-in-part of Ser. No. 07/807,464, filed Dec. 16, 1991, now abandoned.

TECHNICAL FIELD

This invention relates generally to reading data from optical data disks, and more particularly to recovery of data from disk sectors having missing or defective synchronization marks.

BACKGROUND ART

Optical disk media are capable of storing a considerable amount of data in the form of small marks or holes in the surface of the disk, each representing a bit of data. The marks, burned into the surface of the disk by a laser, are arranged along spiral tracks, each divided into a number of sectors.

FIG. 1 is a diagram of an apparatus 10 for reading data prerecorded on an optical disk 12. The disk 12 is rotated by a disk servo 14 comprising a precisely controllable DC motor. A laser 16 irradiates the surface of the disk 12, and light reflected from the disk impinges on the surface of a detector 18. An optical head 20, located between the disk 12 and laser/detector 16, 18, is positioned by another servo (not shown) to read data from a desired track. Writing is carried out using similar optics, with the optical medium being preheated to enable light from laser 16 to form surface marks corresponding to data. The servos and laser/detector are controlled by a processor unit 22.

The components comprising apparatus 10 shown in FIG. 1 typically are arranged within a common housing, such as provided by SCSI (Small Computer System Interface) resident at a personal computer or other computer requiring storage of a large quantity of data.

Data read and write logic, implemented by processor unit 22 in the representative illustration of FIG. 1, has been carried out by commercially available special function integrated circuits, such as the AM95C96 optical disk controller (ODC), manufactured by Advanced Micro Devices of Sunnyvale, Calif. A system implementing the AM95C96, shown in FIG. 2, comprises ODC 24 reading data through an encoder/decoder (ODE) 28 and a phase locked loop (PLL) 30 off the optical disk and writing to the optical disk. A CPU 32 controls seeking to the desired location on the disk. The ODC/ODE 24, 28 interfaces with CPU 32, working memory 34 and a disk interface 36 to process the applied data signals and transfer commands for compliance with particular specifications such as the X3B11 continuous composite servo (CCS), WORM/ERASABLE optical format developed by ANSI.

The ODC 24 is interfaced to a system bus by host interface unit 38, and is supported by buffer memory 40 and error processor 42. General operation of the system shown in FIG. 2, being known to the prior art, is not described in detail. An improvement integrating the ODC/ODE 24,26 as a single functional element is described in copending application Ser. No. 7/813,275, entitled "Single Chip Data Controller for Optical Devices," filed concurrently herewith by the common assignee and incorporated herein by reference.

FIG. 3 depicts the layout of tracks on an optical disk. The tracks are arranged along a spiral path on the surface of the disk 12, with each turn of the spiral being treated as a separate track. In one example, the optical disk may be 90mm in diameter, and may contain 10,000 tracks (numbered 0–9999 in FIG. 3); each track is divided into twenty-five (25) sectors. Each sector in turn will carry 725 bytes of unformatted data. The optical disk in this example is capable of storing 181,250,000 bytes of data, or about 100,000 pages of text. Modifications include implementing more densely packed sectors, larger diameter disks and/or double-sided storage for enhanced information storage capacity.

FIG. 4 is a field diagram of the X3B11 format, comprising a header area that is "pre-stamped", followed by a data area for receiving data for storage. The first field of the header is a sector mark (SM) having a special redundant pattern. This field identifies the start of a sector. The SM field as well as the other fields constituting the X3B11 format is summarized below in Table I.

TABLE I

| NAME | FUNCTION | PATTERN |
|---|---|---|
| SM | Sector Mark | 80 channel bits (5 bytes) Special Redundant Pattern = 5 3 3 7 3 3 3 3 5 long burn followed by 0010010010 = 1111111110000001111110000000000000111111000000111111000000111111111 0010010010 |
| VFO1,2,3 | Lock up field for PLL | Continuous Pattern |
| | | VFO1 = 01001001001 . . . 010010 |
| | | VFO2' = 10010010010 . . . 010010 |
| | | VFO2" = 00010010010 . . . 010010 |
| | | VFO3 = 01001001001 . . . 010010 |
| | | Note: VFO2 varies depending on previous pattern in CRC. |
| AM | Address Mark (Bit/Byte Sync) 16 Channel bits. (1 byte) | 0100 1000 0000 0100 |
| ID | Track No. (2 bytes) Sector No. (1 byte) | High order/Low order bits 7–6 = ID Number (ID 0-2) bit 5 = 0 Reserved bits 4–0 = Sector Number |
| CRC | ID Field Check Bytes (2 bytes) | CRC Polynominal seed = 1's |
| PA | Postamble (one byte) | Allows last CRC and Data byte closure under RLL (2,7) modulation |
| ODF | Offset Detection Flag (one byte) | Not written. no grooves |
| GAP | Gap (Splice) | Unformatted area |
| FLAG | Indicate Written Block | Continuous Pulse (5 byte area. decision by majority) 100100100100100100100100 . . . |
| ALPC | Auto Laser Power Control | Blank 2 bytes zone |
| SYNC | Redundant Sync for Data | Triple sync pattern |

TABLE I-continued

| NAME | FUNCTION | PATTERN |
|---|---|---|
| | 0100 0010 0100 0010 0010 0010 0100 0100 1000 0010 0100 1000 | |
| DATA | User Data, Control, CRC, ECC and RESYNC bytes. | See FIGS. 1.6 and 1.7. |
| BUFFER | Used for RPM timing margins | Not Written area |
| RESYNC | Data Field byte sync 16 Channel bits (1 byte) | 0010 0000 0010 0100 |

NOTE:
All bit patterns show channel code bits in RLL (2,7) modulation.

During both reading and writing operations, ODE 26 or the ODE section of the IODC described in the copending application, detects sector mark (SM) once within each sector. Referring to Table I, the sector mark comprises 80 bits arranged as a long burn followed by a transition pattern. Sector mark decoding is carried out by monitoring the long burn pattern of the track, and identifying a pattern characteristic of the sector mark. An algorithm for this purpose is described in my copending application Ser. No. 7/810,574, entitled "Sector Mark Detection in Long Burn Pattern for Optical Data Disks," (hereinafter referred to as "sector mark copending applications"), filed concurrently herewith and incorporated by reference.

Detection of the sector mark pattern is a prerequisite to the reading of data from the corresponding sector. It identifies the region of each sector from which data is to be read because the data field is displaced from the sector mark by a defined number of bytes depending upon the particular standard involved. For example, in conventional X3B11 format, shown symbolically in FIG. 4, the pre-stamped, or read only (RO), region extends 47 bytes beyond the sector mark field SM, followed by a magneto-optic region (MO) upon which data can be written once (the MO region is also termed a "WORM", or write once-read many, region). The data region of a 90 mm, 512 byte sector size by convention follows the RO region by ODF and GAP bytes. The next sector mark field follows the data field by a buffer region of 13 bytes for timing margins.

Another prerequisite of reading data from the disk is byte and bit alignment of data taken off each sector for decoding. In the X3B11 specification shown in FIG. 4, a synchronization mark (hereinafter termed "sync") of 3 bytes, signifying the start of the sector data field, follows VFO3. There are also several resynchronization marks ("resyncs") of one byte each at regular intervals to ensure byte alignment throughout a read operation. Following a successful header operation, the VFO3 field is searched for presence of the sync. Upon detection of the sync, a "sync found" signal is generated by the ODE and the incoming data stream is decoded one block at a time while data synchronization is maintained by alignment to the resyncs.

In case of sync misdetection as a result of a defect in disk medium or dirt, the sector data will not be able to be read reliably because there is no synchronization of the data stream. Even if the sync is found, failure to detect resyncs will cause the data stream not to byte align properly throughout the read operation. Although a few misaligned blocks of data can be corrected, several misalignments may exceed the allowable data correction capability of available error correction circuitry. Searching for the resyncs using conventional windowing techniques tends to be inaccurate because the size of the search window does not always conform to the probability that a resync will be found.

Accordingly, one feature of the invention recovers sector data in the absence of a sync and aligns data to resyncs distributed in the data field of a sector. Another feature searches for resyncs by windowing in such a manner as to take into account the probability finding resyncs in the designated region of a sector.

DISCLOSURE OF THE INVENTION

A novel recovery routine of this invention enables data to be read from a designated sector of an optical data disk in the presence of damaged or missing syncs or resyncs. The optical data disk is of a type that stores data in sectors arranged serially along a multiplicity of tracks, with each sector having header and data fields preferably conforming to X3B11 specifications.

The routine is carried out first by searching a selected sector of the data disk to detect a sync pattern of bits designating a portion of the data field from which sector data is to be aligned. If the sync pattern is found, a normal data read operation including byte alignment of a first block data from the sector data field is performed. If the sync pattern is not found, the selected sector is searched again and a data recovery operation is performed to "force" byte alignment of the first block of data. This sequence is repeated for any other designated sectors.

In accordance with another aspect of the invention, a "sync found" signal is generated upon finding the sync pattern of bits. If no sync pattern is found, a "pseudo sync" signal is generated. The first block of data is byte aligned to the "sync found" signal during normal read and to the "pseudo sync" signal during data recovery.

In accordance with a further aspect, the data field is searched to find at least one resync pattern of bits designating another portion of the data field from which alignment of sector data is to be maintained. In normal data read operation, resync pattern searching is performed using either a search window of fixed size or a search window of varying size for successive resyncs. In data recovery operation, the search window for resyncs initially is set at a maximum size. Upon finding a resync, the window is reduced to a minimum size, and is then increased in size progressively for successive missing resyncs. When a resync is next found, the size of the window again is reduced to the minimum, and so on.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 4 is a diagram showing X3B11 data format utilized in the preferred embodiment.

FIG. 5 is a block diagram of an optical disk controller incorporating data recovery in accordance with the invention.

FIGS. 6(a)–(c) are flow charts of programming for carrying out aspects of the invention.

FIGS. 7(a)–(c) are waveforms for describing the various search windows generated during data recovery.

FIGS. 8(a)–(e) are waveforms for describing sync found and pseudo sync signal generation in during the data read and recovery modes of operation.

BEST MODE FOR PRACTICING THE INVENTION

Upon failure to find a sync while reading sector data from a track of an optical data disk, an optical data disk controller carries out data recovery, in accordance with the invention, to "forcibly read" data from the region of the sector where data is presumed to reside. The data taken from the sector is byte aligned to resync bytes at regular intervals of the data. Data blocks are supplied to error correction circuitry to correct for non-alignment errors and other errors in the bit stream.

Figure 3:
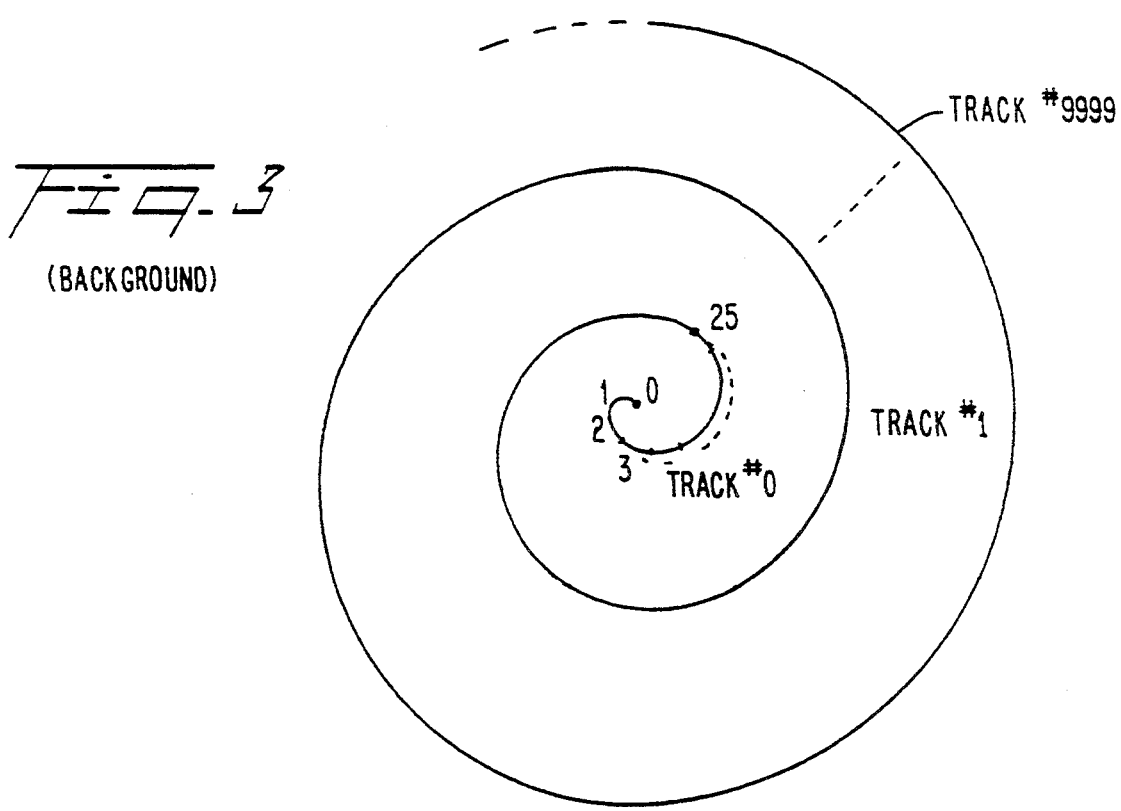
FIG. 3 is a diagram showing a track format of an optical data disk.
Figure 1:
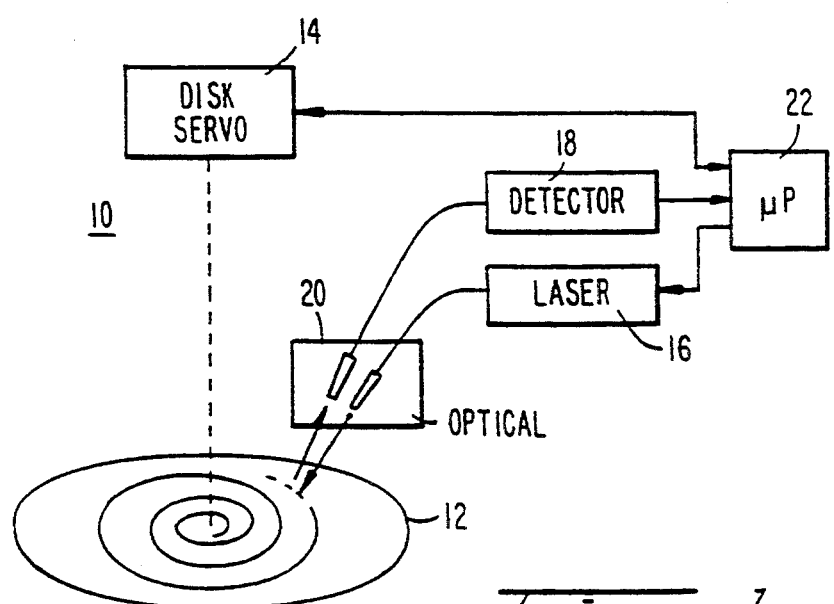
FIG. 1 is a simplified diagram of an optical disk read/write system within which the present invention may be implemented.
Figure 2:
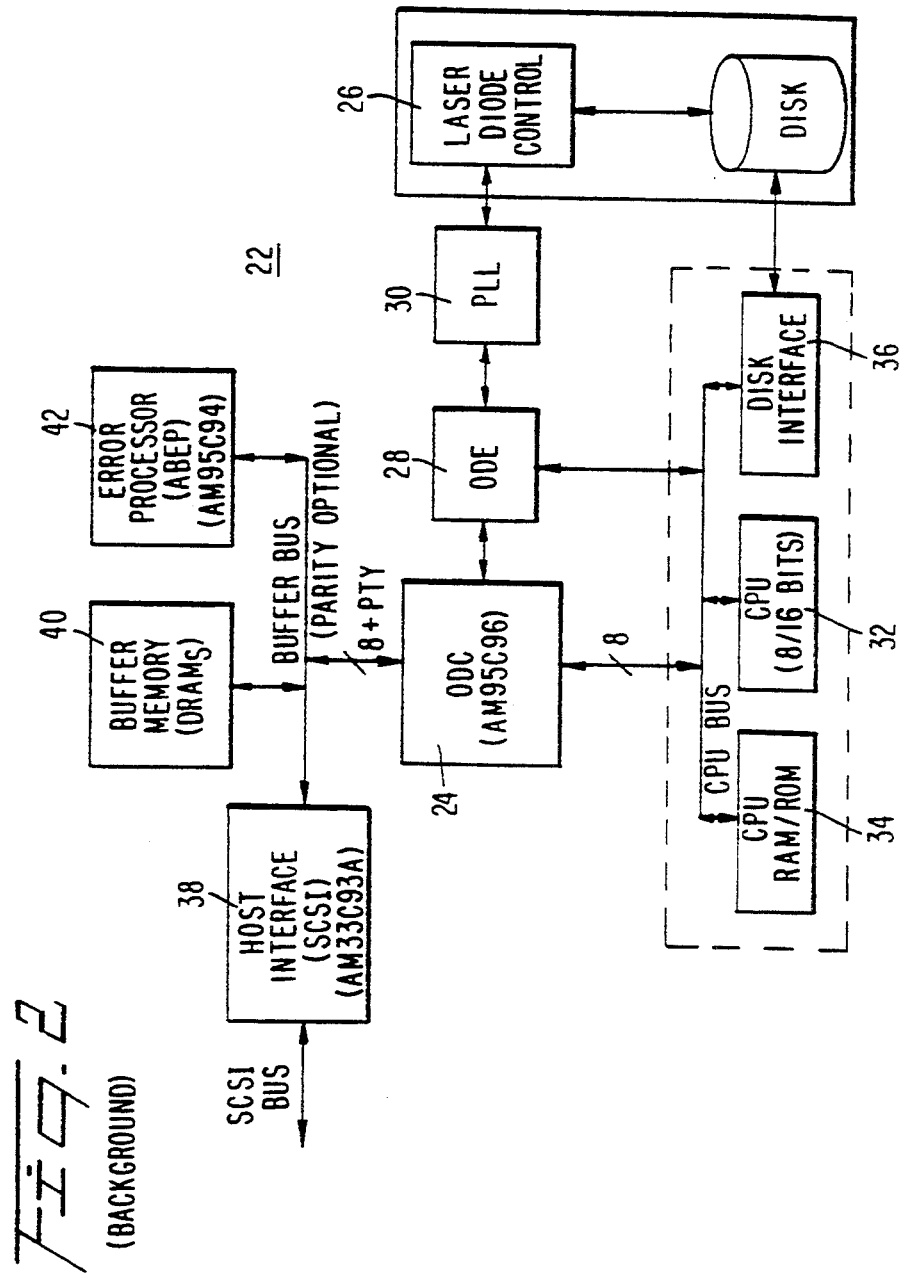
FIG. 2 is a diagram of an optical disk controller system of the prior art.

The invention is implemented by circuitry shown in FIG. 5 with optical disk controller (ODC) and optical data encoder-decoder (ODE) functions integrated on a common integrated circuit substrate. Alternatively, this invention can be practiced with separately provided ODC and ODE functions, using the architecture of FIG. 2. Integration of functions in the manner shown in the preferred embodiment of FIG. 5 is advantageous for reasons detailed in the copending "single chip" application.

The integrated optical disk controller (IODC) 100 shown in FIG. 5 comprises ODC and ODE regions 102, 104 that are depicted as being isolated in separate portions of the chip but in practice may be arranged differently based upon circuit layout constraints. The ODC 102 is similar to ODC 24 of the prior art, although programmed slightly differently and modified somewhat to accommodate new signals developed by the ODE 104. The ODE 104 has been modified considerably from the counterpart prior art unit 28. Aspects of IODC 100 implemented for data recovery are described in detail herein; more detail on other aspects of the IODC are provided in the single chip copending application.

Referring to FIG. 5 in more detail, ODE 104 contains five principal functional circuits in addition to a FIFO and synchronization logic 108. Marks detection circuits 110, 112 detect the various byte patterns or marks forming reference points on the sectors taken from the tracks of an optical data disk being read.

Mark detection and media control logic circuit 112 receives raw data (RAWDAT) taken from the disk, searches for the sector mark pattern provided by X3B11 specifications in the preferred embodiment, and supplies a sector mark found (SMF) signal to one input each of logic OR gates 113 and 115. To the other input of gate 113 is applied a pseudo sector mark signal developed by circuit 112, as described in the copending "sector mark" applications. The sector mark detection and media control logic circuit 112 is synchronized to an external constant reference clock (2FCLK) that operates at twice the frequency as that of ODC 102, that is, at the frequency of the RDREF clock, a requirement of NRZ/RLL 2,7 encoding and decoding.

The output of gate 113 in turn is supplied to an input of OR logic gate 114, the remaining input of which receives an address mark/sync found signal developed by circuit 110 when the corresponding reference marks read from the disk are detected.

The remaining input of logic OR gate 115 receives the output of AND gate 111 whose inputs comprise the sector mark found signal (SMF) from circuit 112 and a user selected pseudo sector mark enable signal (PSME) from ODE registers 130 in ODC 102 as described in the "single chip" copending application.

Marks detection circuit 110 detects patterns of data taken from each sector to identify the presence of the address marks (AM), sync, resyncs (RS) and flag (flag detection is synchronized to 2FCLK). Flag pattern detection is described in detail in copending application Ser. No. 7/810,575, entitled "Repetitive Pattern Detection", also filed on even date herewith and incorporated herein by reference. Marks detection circuit 110 receives DATIN, which is a synchronized encoded data input received from an external phase locked loop (PLL), not shown in FIG. 5 but corresponding to PLL 30 of FIG. 2. This data containing RLL data as well as the AM, sync, resyncs and VFO patterns taken directly from the disk, is synchronized to a clock SYNCLK provided by the PLL. Also supplied to circuit 110 is flag data (FLGDAT) providing flag detection obtained from encoded disk data.

Address marks (AM) or sync found signals developed by marks detection circuit 110 are supplied to another input of logic OR gate 114 as well as to one input of logic OR gate 116. To the other input of gate 116 is provided a signal by marks detection circuit 110 indicating that a resync has been found. The output of logic OR gate 114, designating either that a sector mark, address mark or sync has been found, or a pseudo sector mark has been generated, is supplied to a data section 118 of ODC 102 to enable sector data to be aligned, stored and then transferred to a host bus. The output of gate 116, corresponding to address mark, sync or resync found, is supplied as an output MKF (marks found) signal for diagnostics.

Window control logic circuit 120 controls the size of the resync detection window in accordance with an aspect of this invention. Other window sizes, namely, those for detecting the sector mark, address mark, sync and flag are programmed in writable controls store (WCS) unit 122 of ODC data section 118.

RLL decoder 124 receives DATIN from the disk, synchronized to SYNCLK, and converts the disk sector data from RLL 2,7 to NRZ data for supply to the FIFO and synchronization logic circuit 108. The circuit 108 synchronizes data read from the decoder 124 and marks read from circuit 110 to the reference clock obtained from divider block 125 by using a small FIFO (preferrably 2 bits wide by 14 bits deep). Data bit shift during resync detection is compensated by the FIFO. Block 108 also includes a counter for counting the length of the data segments and controlling generation of RDREF to the ODC 102 during resyncs. Data supplied by logic circuit 108 to data section 118 is read into the section only when RDREF is asserted. Details on this operation are given in the "single chip" copending application.

RLL encoder and marks generation circuit 126 receives data from the data section 118, carries out RLL 2,7 encoding and generates various marks, such as sync, resyncs, etc., for each sector.

Output signals at 128 and SMF at 127, provided principally for diagnostics, are described in the copending "single chip" application.

ODC 102, connected to the SCSI side of the controller, supplies data read and decoded from the disk by ODE 104 and synchronized to sync found signals provided by ODE 104 for storage in a buffer memory (not shown). Various status bits developed by ODE 104 are stored in ODE registers 130 of the ODC 102. As an example, if a sync is not matched, a status flag sill be set in register 130 with an optional interrupt, and a corresponding ID for that sector will be stored in an ODC register (not shown). A CPU (not shown) interfaced to ODC 102, will respond to the interrupt to scan the sector again or scan during the same pass through the sector in a data recovery mode of operation, described later in more detail.

Figure 6B:
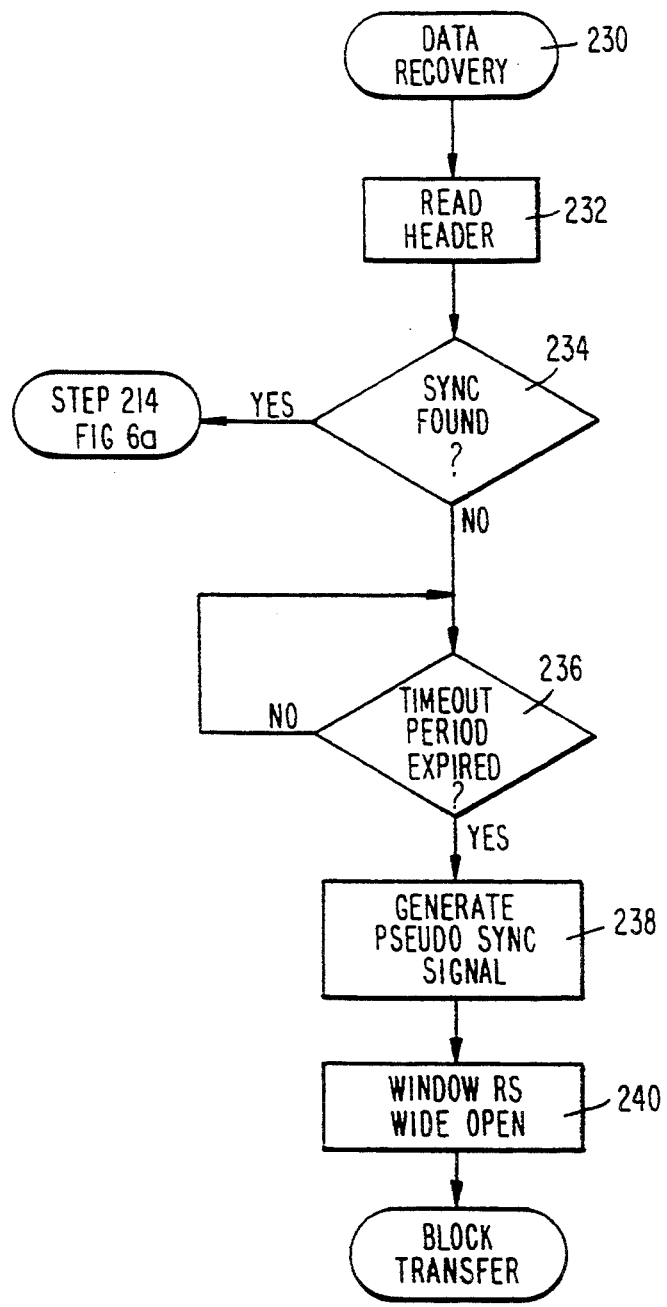

Data read operation, in accordance with the invention, comprises two modes of operation. Referring to FIG. 6(a), in the first mode of operation, a "read header" routine 200, searches the header field for a pattern of bits corresponding to the sector mark using the sector mark algorithms described in the copending "sector mark" applications (step 202). When a sector mark is found, the header is further searched in step 204 for finding an address mark (AM). Assuming that the address mark is found, identification (ID) and CRC data are read from the next field of the header (see FIG. 4). This sequence is repeated until all identification fields are read (step 208). In the XB311 specifications, there are three ID fields. Once all three fields are read by step 208, the program advances to a "read data" routine (step 210), where data from the magnetooptic (MO) field is read from the disk.

The data field is now searched, beginning with VFO 3. Referring to FIGS. 8(a) and 8(b), during the first pass through the sector shown, the search window is maintained wide open by WCS 122 until a sync is detected. Upon detection of a sync, step 212, the window is closed as shown in dotted lines in FIG. 8(b) and a sync found (SF) signal is developed by marks detection circuit 110 per step 214 (see FIG. 8(c)). The program continues to a "block transfer" routine 250, shown in FIG. 6(c), to byte align the sector data to resyncs distributed throughout the data field.

Assuming, however, that a sync is not found in step 212, the window remains open, as shown by the solid line in FIG. 8(b), for a duration preset by the user and corresponding to the duration of the sector data field. The window is closed automatically based a previously programmed count J (step 216). When the count is reduced to zero, step 218, a "no sync found" flag is stored in registers 130 of ODC 102 (step 220). The same routine can be carried out for successive sectors (step 222), or recovery of data for that sector can be provided using routine 230 shown in FIG. 6(b) if the window size J of FIG. 8(b) has been selected by the user to be small. The size of this small window is slightly greater than the length of the sync, as shown in FIG. 8(d).

The CPU responds to the "no sync found" flag. If data recovery is to be carried out in the same pass through the current sector, the interrupt is ignored. Otherwise, the header is again read (step 232) during a second pass through the sector by searching for the sync (step 234). The window used for searching for the sync during the second pass also has a fixed size, slightly greater than the length of the sync field, as shown in FIG. 8(d).

There is a small possibility that the sync will be detected on the second pass. If so, the program returns to step 214, FIG. 6(a), for generation of the sync found signal. However, ordinarily the sync will not be found during the second pass. Upon expiration of a timeout period presented by WCS 122 and corresponding to the window shown in FIG. 8(d), step 236, the ODE generates a pseudo sync signal (step 238), as shown in FIG. 8(e), synchronized to the trailing edge of the window. The pseudo sync signal, produced by the marks detection circuit 110, byte aligns the first block of sector data in the same manner as the sync found (SF) signal. This is a "forced read" of sector data for byte alignment to resync (RS) bytes distributed uniformly in the data field. Because no sync has been found, however, the resync window initially is set to be wide open (step 240) and the program continues to the "block transfer" routine 250 of FIG. 6(c). A wide-open resync window corresponds to a length of 12 2FCLK, when each resync (RS) consists of one byte for X3B11 specifications, as shown in FIGS. 7(a) and 7(b).

During recovery mode operation the window size initially is maintained fixed at a maximum size throughout the data field read until a resync is found. Accordingly, in FIG. 6(c), the block transfer routine 250 transfers a first block of data (DS) (step 262) following byte alignment to the pseudo sync signal. A block of data (DS) may consist of, for example, 15 or 20 bytes, depending upon data format. If a resync (RS) byte is found (step 264), the next block (DS) is byte aligned and transferred, as provided in step 266. If RS is not found in step 264, the block (DS) is transferred without any byte alignment (268). The importance of this step is that the data, although not byte aligned, is not lost. It is supplied to error correction circuitry (not shown) that will be able to correct up to a particular number of data blocks.

After checking the data field count in step 270, the routine returns to step 264 to search for the resync byte after adjusting window size in step 272, as described below.

If a resync byte has not been found, the size of the window is maintained fixed at the maximum. Thereafter, when a resync byte is found, the resync window size is reduced to a predetermined minimum, and progressively increased in size for successive resync bytes, as shown in FIG. 7(c). Window size is increased progressively to the predetermined maximum (selected as a function of the length of the data section of each sector and the speed tolerance of the disk medium) controlled by window logic circuit 120. However, each time the resync byte is detected, the window size is reduced to the minimum, and the sequence repeats, as shown in FIG. 7(c).

Figure 6C:
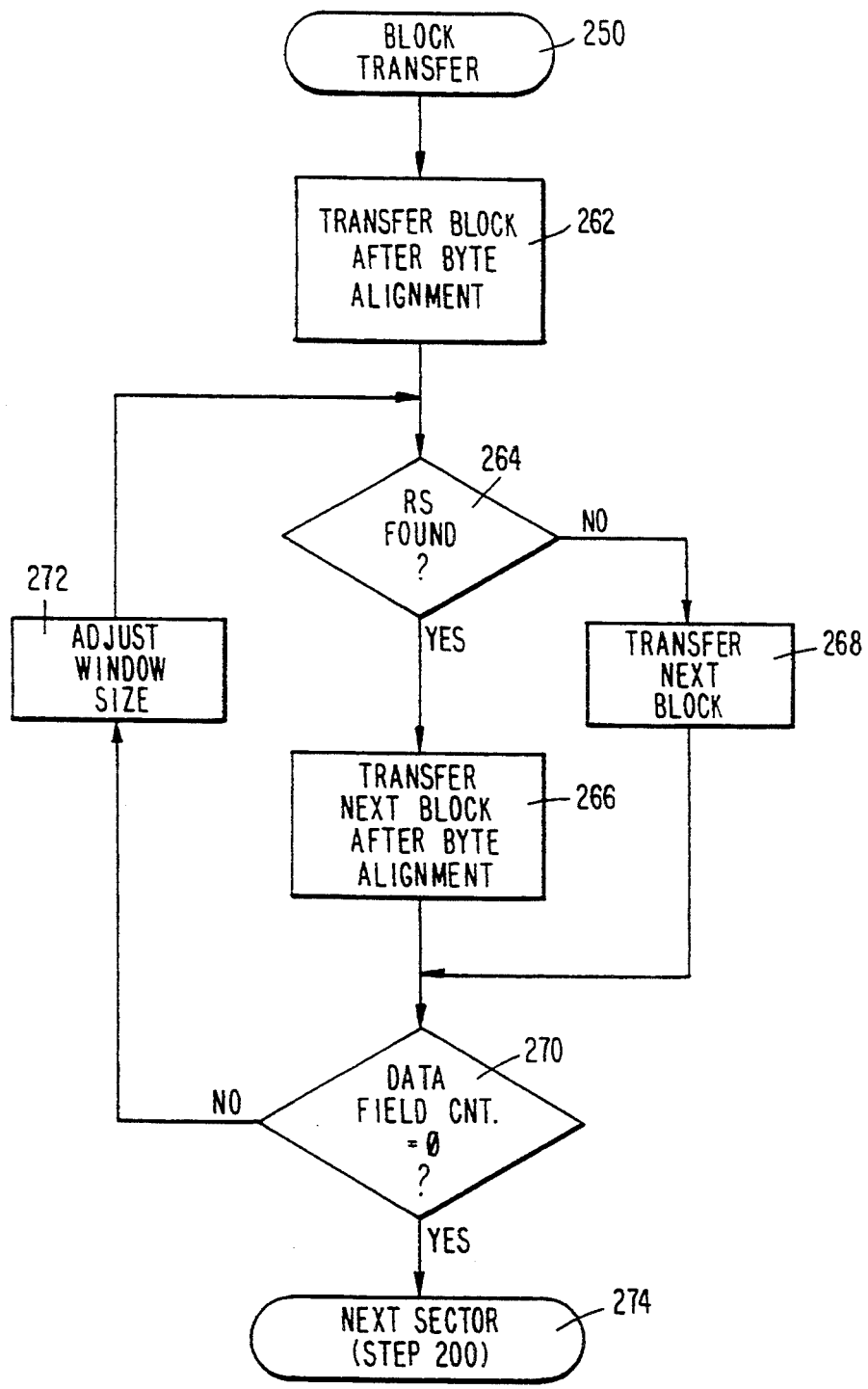

During normal data read, the block transfer routine of FIG. 6(c) operates in either of two modes, selected by the user. In a first mode, the size of the window is fixed for successive resync bytes as shown in FIG. 7(b); in the other the size of the resync window increases progressively (e.g., from ±3 to ±12) as in FIG. 7(c) and in the same manner as recovery mode.

The invention described above accordingly carries out data recovery in the absence of a good sync mark in the disk data by forcing data to be read from a sector by aligning the first data block to a pseudo sync mark generated at the location of the sector when the sync mark is expected to reside. The bit stream is aligned to resyncs distributed in the data field of the sector. The size of the search window for finding successive resyncs is appropriately controlled for normal read and data recovery modes of operation based upon the probability that the next resync will be found in the expected region of the field.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed:

1. An optical data disk controller for an optical data disk having tracks adapted to contain data arranged in sectors, comprising:
    first means for searching a predefined region of a selected sector of data read from said disk for a pattern of bits corresponding to a sync to which a data stream to be read from said sector is to be aligned;
    second means responsive to said first means for generating a "sync found" signal upon detection of said sync pattern in said predefined region;
    third means responsive to said first means for generating a "pseudo-sync" signal in an absence of said sync pattern in said predefined region;
    fourth means responsive to said "sync found" signal or pseudo-sync"signal for byte aligning the data stream to be read from said selected sector;
    fifth means for detecting resync patterns of bits read from said selected sector to maintain byte alignment throughout the data stream; and
    sixth means for establishing a first search window having a programmably variable first width for searching for said sync patterns and for establishing a second search window having a programmably variable second width for searching for said resync patterns.

2. The controller of claim 1, wherein said second width is progressively increased during searches for successive resync patterns of bits.

3. The controller of claim 1, wherein said sixth means comprises means for reducing a width of the first search window to a first value when the sync pattern is detected.

4. The controller of claim 1, wherein said sixth means comprises means for setting a width of the first search window to a second value if no sync pattern is detected.

5. A method of data recovery from an optical data disk storing data in sectors arranged serially along a multiplicity of tracks, each sector having header and data field the method comprising the steps of:
    (a) searching a selected sector of said data disk to detect a sync pattern of bits designating a portion of said data field from which sector data is to be aligned;
    (b) in response to detection of said sync pattern in step (a), performing a normal data read operation including byte aligning data taken from said sector data field;
    (c) in response to non-detection of said sync pattern in step (a), performing a data recovery operation including byte aligning data taken from said sector data field and
    (d) repeating steps (a)-(c) for any other selected sectors;
    said data read and data recovery operations including searching said data field within a search window to detect at least one resync pattern of bits designating another portion of said data field from which alignment of said sector data is to be maintained, wherein said search window size is progressively increased during searches for successive resync patterns of bits in each of said data read and data recovery operations.

6. The method of claim 5, wherein step (b) includes generating a "sync found" signal upon detection of said sync pattern of bits; and
    step (c) includes generating a "pseudo sync" signal in an absence of said sync pattern of bits; and further wherein
    data is byte aligned respectively to said "sync found" and said "pseudo sync" signals during said normal data read and data recovery operations.

7. The method of claim 5, including searching said data field to detect at least one resync pattern of bits designating another portion of said data field from which alignment of said sector data is to be maintained.

8. The method of claim 5, wherein the size of said search window for said resync pattern of bits during normal data read operation initially is at a predetermined minimum value and is increased progressively for successive resyncs.

9. The method of claim 8, wherein, following detection of a resync pattern, the size of said search window is reduced to said minimum value.

10. The method of claim 9, wherein said minimum value corresponds to the displacement of a current resync from the immediately previous sync or resync.

11. The method of claim 8, wherein said minimum value corresponds to the displacement of a current resync from the immediately previous sync or resync.

12. The method of claim 5, wherein said step of searching a selected sector is performed once for both of said normal data read and data recovery operations.

13. The method of claim 5, wherein said step of searching a selected sector is performed for each of said normal data read and data recovery operations.

14. The method of claim 5, wherein the size of said search window for said resync pattern of bits during data recovery operation initially is at a predetermined maximum value, and is reduced to a predetermined minimum value following detection of a resync pattern.

15. The method of claim 14, wherein said minimum value corresponds to the displacement of a current resync from the immediately previous sync or resync.

16. The method of claim 14, wherein said maximum size of said search window is selected as a function the length of a data section of each sector and a speed tolerance of said disk medium.

17. A method of data recovery from an optical data disk storing data in sectors arranged serially along a multiplicity of tracks, each sector having header and data field, the method comprising the steps of:
    (a) searching a selected sector of said data disk to detect a sync pattern of bits designating a portion of said data field from which sector data is to be aligned;

(b) in response to detection of said sync pattern in step (), performing a normal data read operation including byte aligning data taken from said sector data field;

(c) in response to non-detection of said sync pattern in step (a), performing a data recovery operation including byte aligning data taken from said sector data field; and (d) repeating steps (a)-(c) for any other selected sectors;

said data read and data recovery operations including searching said data field to detect at least one resync pattern of bits designating another portion of said data field from which alignment of said sector data is to be maintained, wherein during said normal read operation, resync patterns are searched using a window selectively of a fixed or progressively increasing size for successive resyncs, and wherein during said data recovery operation, resync patterns are searched using a window that is (1) initially fixed and of a predetermined maximum size, and following finding of a mark is (2) reduced to a predetermined minimum size and then increased progressively for successive resyncs.

18. The method of claim 17, wherein said minimum value corresponds to the displacement of a current resync from the immediately previous sync or resync.

19. The method of claim 17, wherein said maximum size of said search window is selected as a function the length of a data section of each sector and a speed tolerance of said disk medium.

20. The method of claim 17, wherein the size of the window for searching the resync patterns is maintained fixed at the maximum size if no resync pattern is found, and is reduced to the minimum size and then increased progressively each time the resync pattern is detected.

* * * * *